United States Patent
Hsu et al.

(10) Patent No.: US 12,048,999 B2
(45) Date of Patent: Jul. 30, 2024

(54) METHOD FOR PERFORMING TOOL CHANGE WITH ROBOT ARM

(71) Applicant: CHIEFTEK PRECISION CO., LTD., Tainan (TW)

(72) Inventors: Ming-Che Hsu, Tainan (TW); Syuan-Jyun Wu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 0 days.

(21) Appl. No.: 17/667,851

(22) Filed: Feb. 9, 2022

(65) Prior Publication Data
US 2023/0173688 A1    Jun. 8, 2023

(30) Foreign Application Priority Data

Dec. 6, 2021  (TW) ................................. 110145491
Dec. 13, 2021  (TW) ................................. 110146631

(51) Int. Cl.
*B23Q 3/155* (2006.01)
*B25J 15/04* (2006.01)

(52) U.S. Cl.
CPC ....... *B25J 15/0491* (2013.01); *B25J 15/0433* (2013.01); *Y10S 483/901* (2013.01)

(58) Field of Classification Search
CPC .............. B25J 15/0491; Y10S 483/901; B23Q 3/15536; B23Q 3/155–3/15793; Y10T 483/18
(Continued)

(56) References Cited

U.S. PATENT DOCUMENTS 4,499,650 A * 2/1985 Cannon .............. B23Q 3/15526
                                                    483/54
5,111,573 A * 5/1992 Ito ............................ B23B 39/18
                                                    483/57
(Continued)

FOREIGN PATENT DOCUMENTS

DE     3710297 A1 * 10/1988
DK     3681679 T3    5/2021
(Continued)

OTHER PUBLICATIONS

Merriam-Webster's Collegiate Dictionary, 10th edition, copyright 1998, p. 1013, definition of "robot".*
(Continued)

*Primary Examiner* — Erica E Cadugan
(74) *Attorney, Agent, or Firm* — Rosenberg, Klein & Lee

(57) ABSTRACT

A method for performing a tool change with a robot arm. Providing a first coupling unit connected to a robot arm end shaft; providing a plurality of tool changer grippers and second coupling units detachably connected to the respective tool changer grippers; the robot arm end shaft driving the first coupling unit to be coupled with a selected second coupling unit and take the selected second coupling unit away from the corresponding tool changer gripper; the robot arm end shaft driving the first coupling unit coupled with the selected second coupling unit back to the corresponding tool changer gripper to be decoupled from the selected second coupling unit; enabling the corresponding tool changer gripper to have a degree of freedom; the corresponding tool changer gripper being self-displaced by the degree of freedom in the coupling operation and in the decoupling operation to overcome a position error.

13 Claims, 12 Drawing Sheets

(58) Field of Classification Search
USPC .................................................. 483/901, 58
See application file for complete search history.

(56) References Cited

U.S. PATENT DOCUMENTS

| | | | | |
|---|---|---|---|---|
| 5,860,900 | A * | 1/1999 | Dunning | B23Q 3/15536 |
| | | | | 414/730 |
| 11,130,243 | B2 | 9/2021 | Son | |
| 2006/0079384 | A1 * | 4/2006 | Yoshida | B23Q 3/15713 |
| | | | | 483/37 |
| 2017/0361410 | A1 * | 12/2017 | Sato | A61C 13/00 |
| 2019/0217471 | A1 * | 7/2019 | Romano | B25J 15/0491 |

FOREIGN PATENT DOCUMENTS

| | | | |
|---|---|---|---|
| FR | 2555927 A1 * | 6/1985 | |
| GB | 1605150 A * | 2/1982 | |
| GB | 2271945 A * | 5/1994 | |
| GB | 2292365 A | 2/1996 | |
| TW | I790025 B | 1/2023 | |
| WO | 2020249465 A1 | 12/2020 | |

OTHER PUBLICATIONS

Machine translatio of DE 3710297 A1, which DE '297 was published Oct. 1988.*

* cited by examiner

METHOD FOR PERFORMING TOOL CHANGE WITH ROBOT ARM

FIELD OF THE INVENTION

The present invention relates to a method for performing a tool change with a robot arm. In particular, a tool changer gripper has a degree of freedom of a limited travel. When there is a position error of the robot arm end shaft during the tool change operation, the position error can be overcome by the freedom of the tool change gripper, so that the first coupling unit driven by the robot arm can still be coupled with or decoupled from a second coupling unit held by the tool changer gripper smoothly, so as to complete the tool change operation.

BACKGROUND OF THE INVENTION

As disclosed in PCT International Publication No. WO2020249465A1 titled "TOOL CHANGER FOR COLLABORATIVE ROBOTS, A ROBOT TOOL CHANGER SYSTEM AND A METHOD FOR CONNECTING A TOOL TO A ROBOT ARM" and U.K. Patent Application Publication No. GB2292365A titled "automatic tool changer", the robot arm is to couple a tool coupling unit held by a tool changer gripper, and then drives the tool coupling unit out of the tool changer gripper in a horizontal direction, so that the tool can be changed in a small space. In the disclosure of PCT International Publication No. WO2020249465A1, the device holder (44) is a fixed type. In the process that the second tool changer part (14) enters or leaves the device holder (44), the device holder (44) does not have any degrees of freedom. Therefore, the device holder (44) cannot be moved. Once there is an error in the preset working path of the robot arm, the first tool changer part (12) will not be coupled with or decoupled from the second tool changer part (14) in the correct position. This will cause the interference of the first tool changer part (12) and the second tool changer part (14) to be coupled with or decoupled from each other. This situation increases the wear between the first tool changer part (12) and the second tool changer part (14) and reduces the precision of their combination. In severe cases, the first tool changer part (12) may collide unexpectedly with the second tool changer part (14) to cause damages.

As disclosed in U.S. Pat. No. 11,130,243B2 titled "Tool coupler, tool changer, tool mounter, and tool change system having the same", the magnet module 40 and the magnetic module 70 are used for coupling between the coupler 20 of the tool 3 and the changer 50, when the tool 3 is to be hung back to the structure 4 such as a wall, a shelf, etc., the mounter 80 can be used to abut the structure 4, so that the changer 50 can continue to be displaced and separated from the coupler 20. Similarly, there is no degrees of freedom between the mounter 80 and the structure 4, which the mounter 80 may not be accurately hung back to the structure 4 by the displacement error when the changer 50 drives the coupler 20 moveing.

In fact, when the robot arm is actually manipulated, the preset position of the robot arm end shaft is prone to have a position error. The reasons for this position error are factors such as temperature changes, the precision of the parts of the robot arm, the wear of the parts of the robot arm, etc. When the position error is too large, it will cause the failure of changing the tool or the failure of gripping the tool.

SUMMARY OF THE INVENTION

In view of the above-mentioned shortcomings, the primary object of the present invention is to provide a method for performing a tool change with a robot arm, comprising the following steps of: providing a first coupling unit connected to a robot arm end shaft; providing a plurality of tool changer grippers and second coupling units detachably connected to the respective tool changer grippers; the robot arm end shaft driving the first coupling unit to perform a coupling operation for the first coupling unit to be coupled with a selected one of the second coupling units and take the selected second coupling unit away from the corresponding tool changer gripper; the robot arm end shaft driving the first coupling unit coupled with the selected second coupling unit back to the corresponding tool changer gripper and performing a decoupling operation for the first coupling unit to be decoupled from the selected second coupling unit; enabling the corresponding tool changer gripper to have a degree of freedom; the corresponding tool changer gripper being self-displaced by the degree of freedom in the coupling operation and in the decoupling operation to overcome a position error of the first coupling unit so that the first coupling unit can be coupled with or decoupled from the second coupling unit.

Preferably, the degree of freedom is a rotational degree of freedom of a limited angle or/and a movement degree of freedom of a limited travel.

Preferably, the degree of freedom is a one-dimensional degree of freedom, a two-dimensional degree of freedom, or a three-dimensional degree of freedom.

Preferably, the tool changer gripper is provided with a return force. The return force acts on the tool changer gripper. During the coupling operation and the decoupling operation of the first coupling unit and the second coupling unit, an external operating force is generated due to the position error. The external operating force is greater than the return force so that the tool changer gripper deviates from a preset position. After the external operation force disappears, the tool changer gripper is driven back to the preset position by the return force. The return force is an elastic force.

Preferably, the degree of freedom has a first travel in a first direction, the degree of freedom has a second travel in a second direction, and the degree of freedom has a third travel in a third direction. The first direction, the second direction and the third direction are perpendicular to one another. Any one or all of the first travel, the second travel and the third travel are adjustable.

Preferably, the degree of freedom is configured to perform an asymmetric adjustment.

According to the above-mentioned technical features, the present invention can achieve the following effects:
1. The tool changer gripper of the present invention has a degree of freedom, so that the tool changer gripper can move for a limited travel in a free space. When the robot arm is to perform a tool change or tool replacement, if the robot arm end shaft has a position, the degree of freedom can overcome the position error, so that the first coupling unit fixed to or extending from the robot arm end shaft can still be coupled with or decoupled from the selected second coupling unit held by the corresponding tool changer gripper smoothly, so as to complete the operation of changing the tool or replacing the tool and to avoid the interference or damage between the first coupling unit and the second coupling unit effectively.
2. The freedom of the tool changer gripper can be adjusted. When the position error of the robot arm end shaft is relatively large, the degree of freedom can be adjusted to be relatively large to overcome the position error.

3. The tool changer gripper has a return force. When the tool changer gripper leaves a preset position in order to overcome the position error and after the factor of the position error is eliminated, the return force enables the tool changer gripper return to the preset position, so that the subsequent tool change or tool replacement can be performed well.

DESCRIPTION OF THE PREFERRED EMBODIMENTS

Embodiments of the present invention will now be described, by way of example only, with reference to the accompanying drawings. The first direction, the second direction and the third direction in the embodiments are for the convenience of describing the spatial relationship, and the directions of the degrees of freedom of the present invention are not limited thereto. In the embodiments, the first coupling unit approaches and moves away from the second coupling unit in the second direction, and the first coupling unit takes the second coupling unit away from the tool changer gripper or takes the second coupling unit back to the tool changer gripper in the first direction. However, by using the first coupling unit and the second coupling unit with different structures, the first coupling unit may approach and move away from the second coupling unit in other directions. As disclosed in the Patent No. DK3681679, the first coupling unit approaches and moves away from the second coupling unit in the first direction, and the first coupling unit takes the second coupling unit away from the tool changer gripper or takes the second coupling unit back to the tool changer gripper in the first direction. This moving method of the first coupling unit and the second coupling unit can be implemented in the present invention. In addition, in the Priority application TW110145491 of the present invention, it is disclosed how the first coupling unit is coupled with/decoupled from the second coupling unit, and how the second coupling unit is engaged with/disengaged from the tool changer gripper, which will not be repeated in the present invention.

Figure 1:
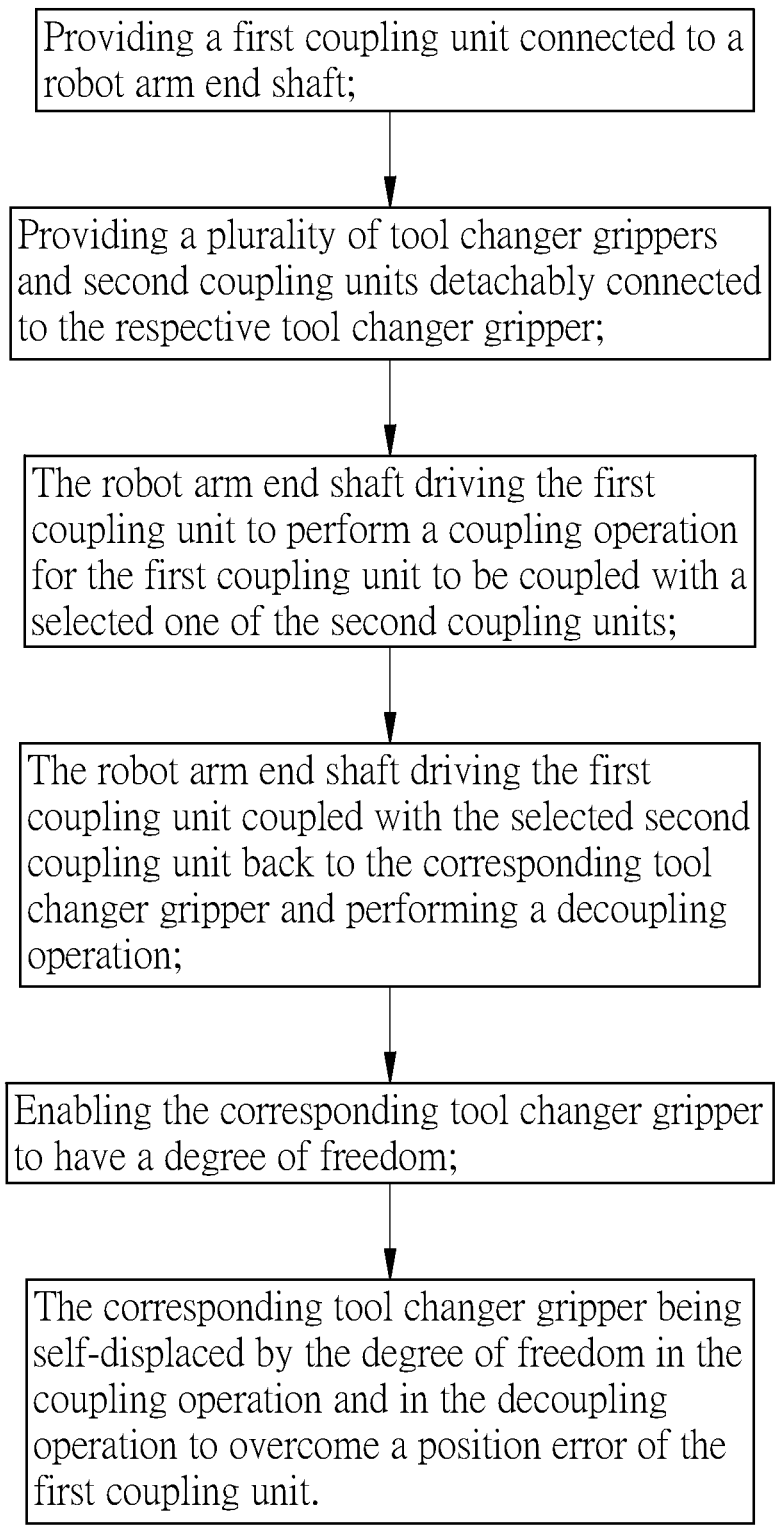
FIG. 1 is a flow chart of a method for performing a tool change with a robot arm of the present invention.

As shown in FIG. 1, the present invention discloses a method for performing a tool change with a robot arm. The method comprises the following steps of: providing a first coupling unit connected to a robot arm end shaft; providing a plurality of tool changer grippers and second coupling units detachably connected to the respective tool changer grippers; the robot arm end shaft driving the first coupling unit to perform a coupling operation for the first coupling unit to be coupled with a selected one of the second coupling units and take the selected second coupling unit away from the corresponding tool changer gripper; the robot arm end shaft driving the first coupling unit coupled with the selected second coupling unit back to the corresponding tool changer gripper and performing a decoupling operation for the first coupling unit to be decoupled from the selected second coupling unit; enabling the corresponding tool changer gripper to have a degree of freedom; the corresponding tool changer gripper being self-displaced by the degree of freedom in the coupling operation and in the decoupling operation to overcome a position error of the first coupling unit so that the first coupling unit can be coupled with or decoupled from the second coupling unit.

Figure 2:
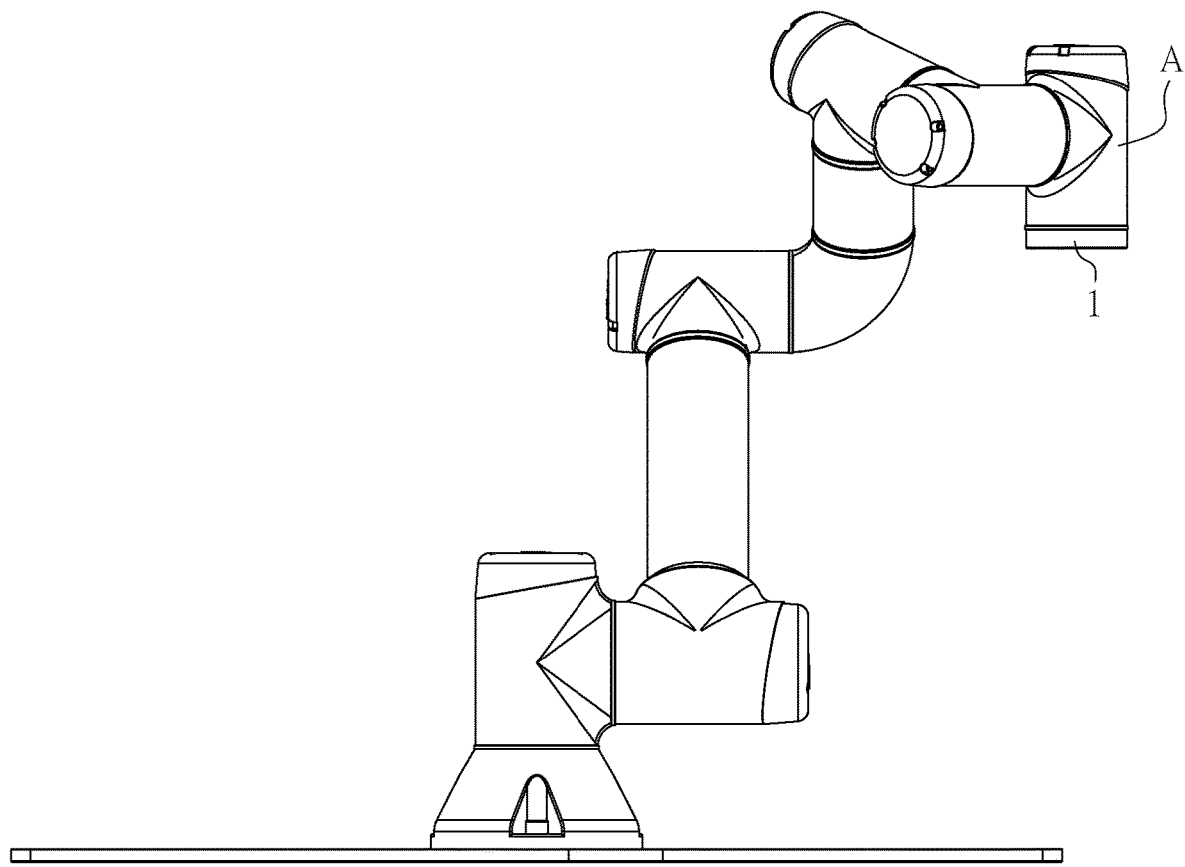
FIG. 2 is a perspective view of the robot arm connected with the first coupling unit of the present invention.

Please refer to FIG. 2. A first coupling unit 1 is fixed to or extends from a robot arm end shaft A. The robot arm is controlled by a program for the robot arm end shaft A to move along a preset path.

Figure 3:
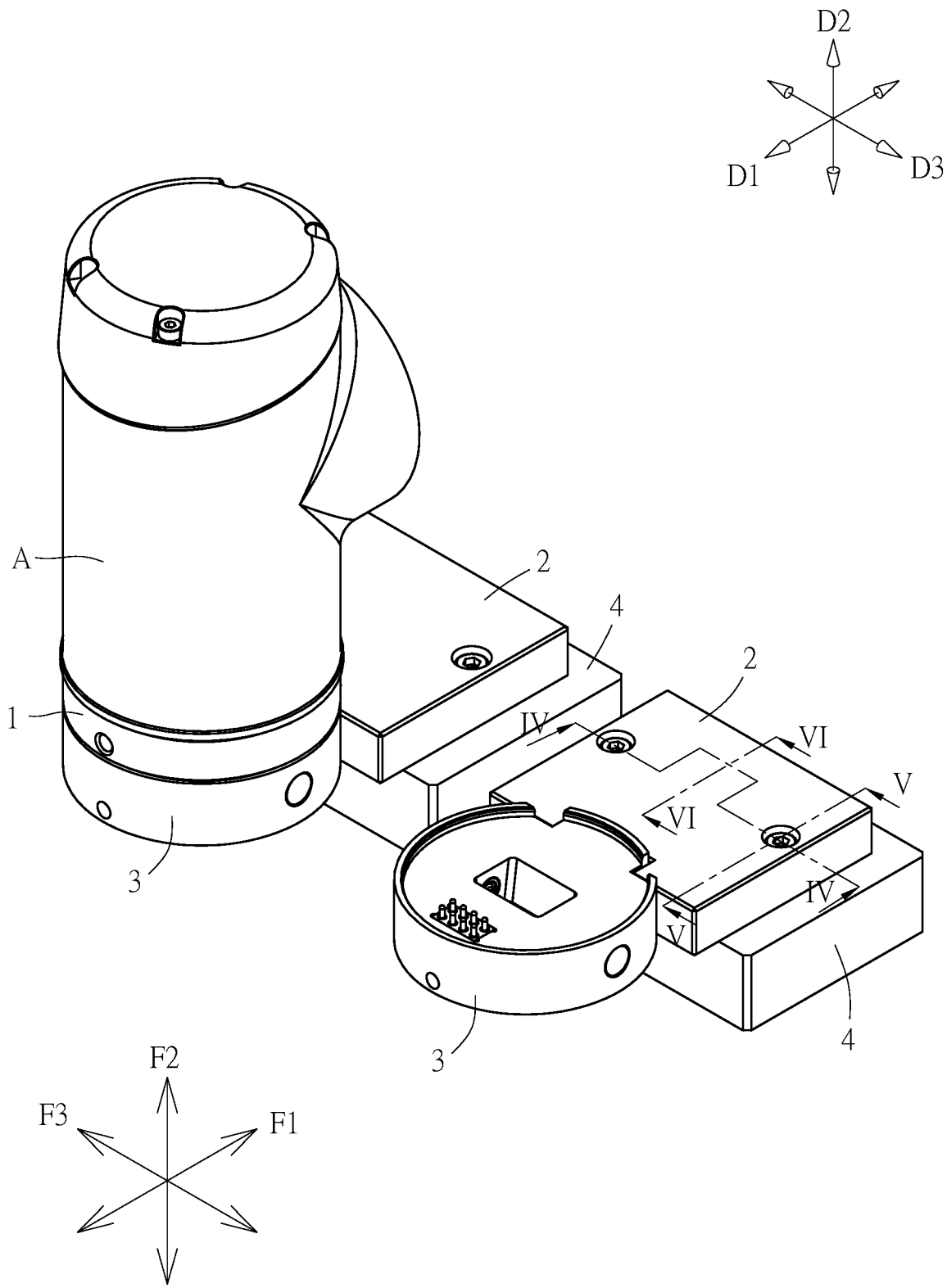
FIG. 3 is a perspective view of the present invention, illustrating that the first coupling unit connected to the robot arm end shaft is coupled with the selected second coupling unit held by a corresponding one of the tool changer grippers.

As shown in FIG. 2 and FIG. 3, the robot arm end shaft A drives the first coupling unit 1 to move between a plurality of tool changer grippers 2 each configured to grip a second coupling unit 3. Different second coupling units 3 are connected with different tools or tool parts (not shown in the figures). Through the first coupling unit to take the selected second coupling unit away from the corresponding tool changer gripper or to take the selected second coupling unit back to the corresponding tool changer gripper, the robot arm can perform a tool change for a desired tool held by the corresponding tool changer gripper 2, so as to complete a specific machining process.

As shown in FIG. 3, the robot arm end shaft A drives the first coupling unit 1 to perform a coupling operation. In the coupling operation, the first coupling unit 1 is driven to be coupled with the second coupling unit 3 along the second direction D2, and then the robot arm end shaft A drives the first coupling unit 1 to move along the first direction D1 to take the selected second coupling unit 3 away from the tool changer gripper 2.

As shown in FIG. 3, the robot arm end shaft A drives the first coupling unit 1 and the selected second coupling unit 3 to perform a decoupling operation. In the decoupling operation, the robot arm end shaft A, the first coupling unit 1 and the selected second coupling unit 3 together return to the tool changer gripper 2 along the second direction D2. After the second coupling unit 3 is held by the tool changer gripper 2, the robot arm end shaft A drives the first coupling unit 1 away from the second coupling unit 3 along the first direction D1.

Figure 4:
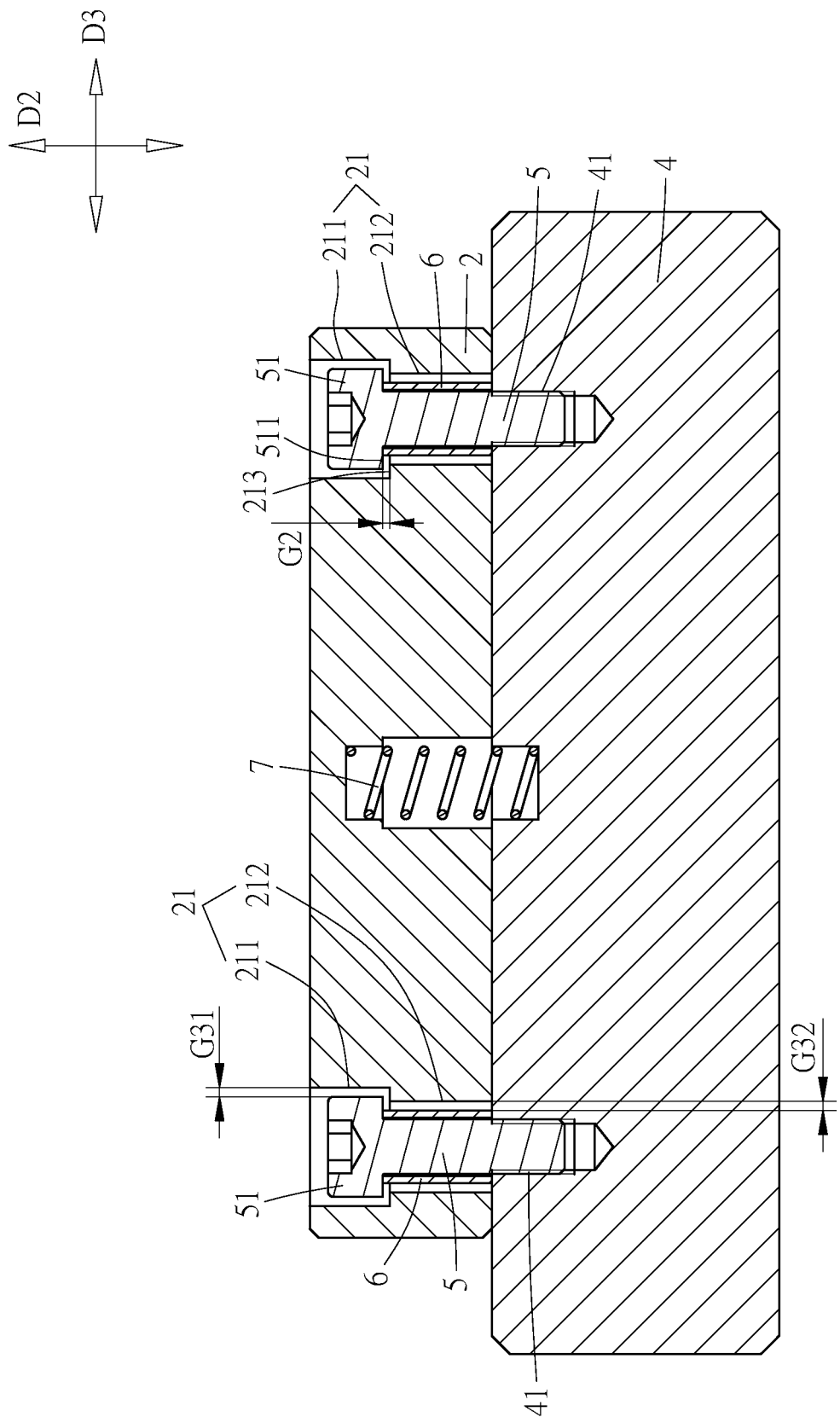
FIG. 4 is a first cross-sectional view showing the rotation of the tool changer gripper and the base of the present invention.
Figure 5:
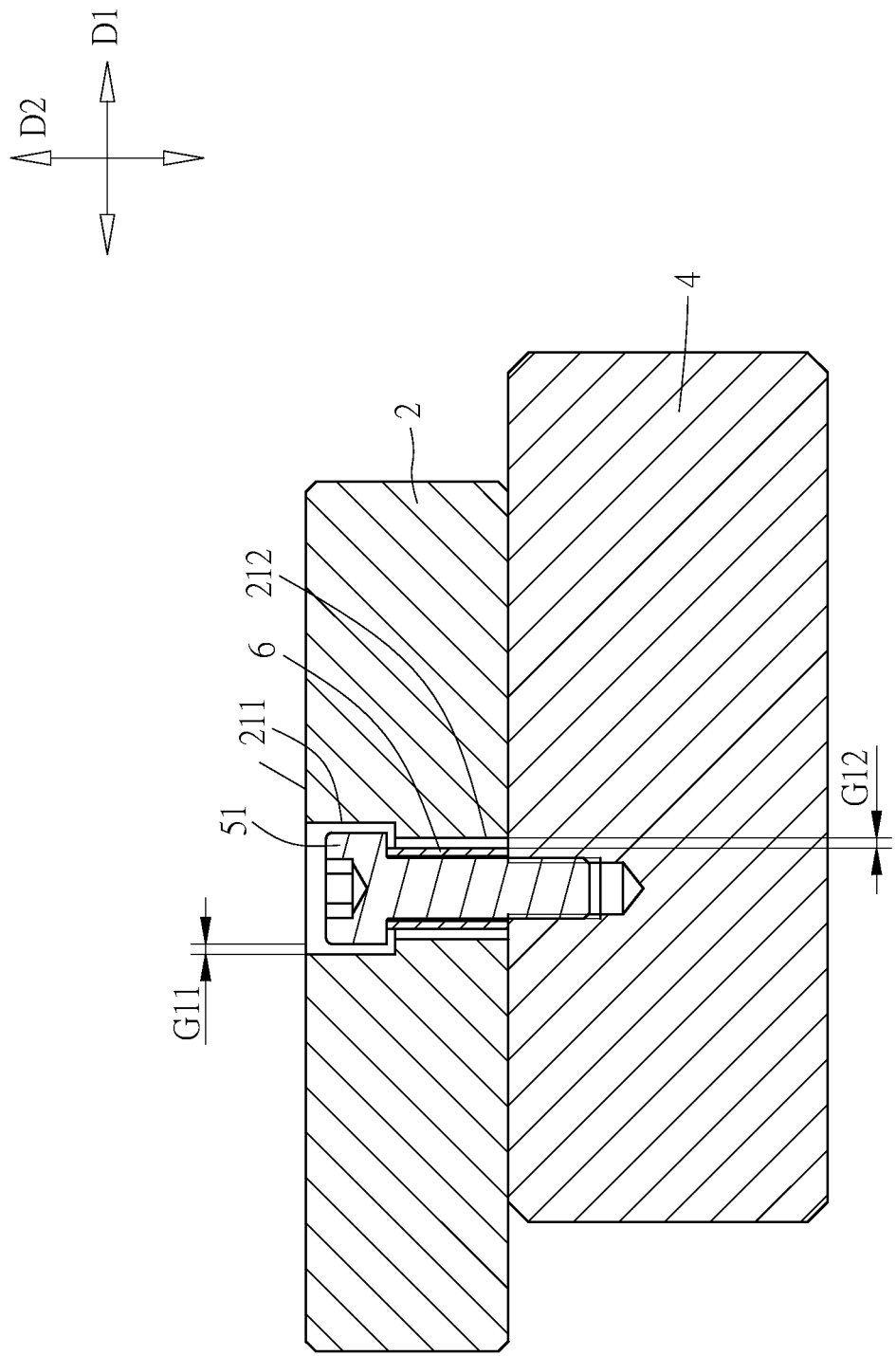
FIG. 5 is a second cross-sectional view showing the assembly of the tool changer gripper and the base of the present invention.

As shown in FIG. 3, FIG. 4 and FIG. 5, the tool changer gripper 2 is connected to a stationary base 4 along the second direction D2. The tool changer gripper 2 has a degree of freedom, and can be moved relative to the base 4 or be inclined relative to the base 4 in the first direction D1, the second direction D2 and the third direction D3. FIG. 4 is a cross-sectional view of the rotation of the tool changer gripper 2 and the base 4. The tool changer gripper 2 has two through holes 21 extending along the second direction D2. Each through holes 21 includes a first hole section 211, a second hole section 212, and a stepped surface 213 between the first hole section 211 and the second hole section 212. The base 4 has two threaded holes 41 extending along the second direction D2 and corresponding to the through holes 21. Two screws 5 are inserted through the through holes 21 and screwed to the threaded holes 41 respectively, so that the tool changer gripper 2 is connected to the base 4. Each screw 5 is sleeved with a sleeve 6. A screw head 51 of each screw 5 is located in the first hole section 211. A third upper clearance G31 is defined between each screw head 51 and the wall of the first hole section 211 in the third direction D3. The sleeve 6 is located in the second hole section 212. The height of the sleeve 6 in the third direction D3 is greater than the height of the second hole section 212 in the third direction D3. A third lower clearance G32 is defined between the sleeve 6 and the wall of the second section 212 in the third direction D3. In this embodiment, the screw head 51, the cross-section of the first hole section 211, the sleeve 6 and the cross-section of the second hole section 212 are all circular. The distance of the third upper clearance G31 is equal to that of the third lower clearance G32. The third upper clearance G31 or the third lower clearance G32 forms a third travel of the degree of freedom in the third direction D3. A screw head underside 511 of the screw head 51 abuts against the end of the sleeve 6. Because the height of the sleeve 6 in the second direction D2 is greater than the height of the second hole section 212 in the second direction D2, a second clearance G2 is defined between the screw head underside 511 and the stepped surface 213. The second clearance G2 forms a second travel of the degree of freedom in the second direction D2. FIG. 5 is another cross-sectional view of the tool changer gripper 2 and the base 4. A first upper clearance G11 is defined between each screw head 51 and the wall of the first hole section 211 in the first direction D1. A first lower clearance G12 is defined between the sleeve 6 and the wall of the second section 212 in the first direction D1. In this embodiment, the distance of the first upper clearance G11 is equal to that of the first lower clearance G12. The first upper clearance G11 or the first lower clearance G12 forms a first travel of the degree of freedom in the first direction D1. In this embodiment, the position of the tool changer gripper 2 shown in FIG. 4 is a preset position, which represents the original position of the tool changer gripper 2 after the tool changer gripper 2 and the base 4 are assembled.

Figure 6:
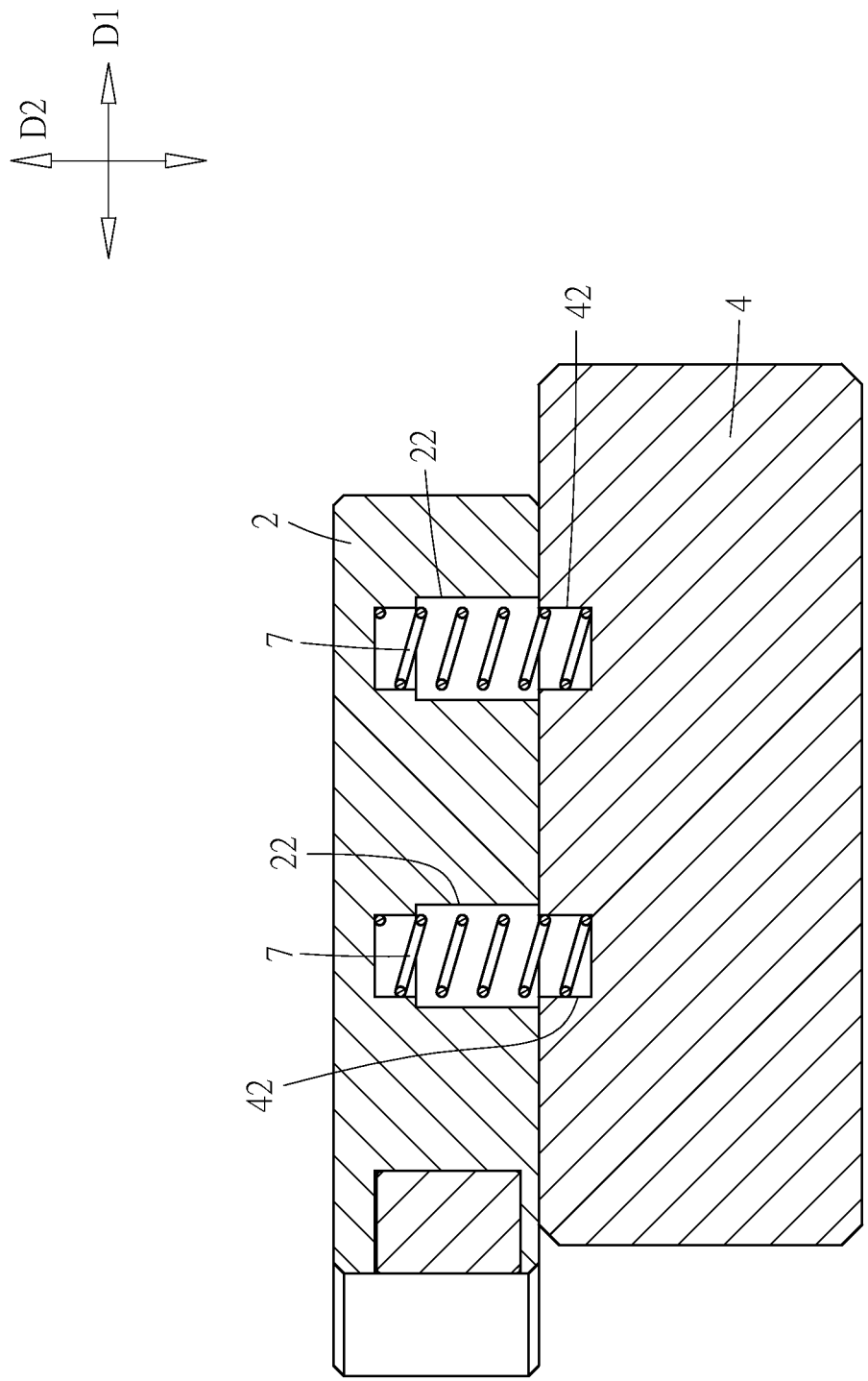
FIG. 6 is a third cross-sectional view showing the assembly of the tool changer gripper and the base of the present invention.

Please refer to FIG. 3 and FIG. 6. The tool changer gripper 2 has at least one first blind hole 22 extending along the second direction D2. The base 4 has at least one second blind hole 42 extending along the second direction D2 and corresponding in number to the first blind hole 22. The cross-sections of the first blind hole 22 and the second blind hole 42 are both circular, and together form at least one closed space. The blind holes 22 and 42 are recesses, as can be seen in at least FIG. 6. A spring 7 is accommodated in the closed space. Two ends of the closed space in the second direction D2 are reduced for securing two ends of the spring 7. Except for the two ends of the closed space, the diameter of the closed space is greater than the outer diameter of the spring 7 so that the spring 7 does not interfere with the freedom degree of the tool changer gripper 2. Since the closed space and the outer diameter of the spring 7 are both circular, the movement of the limited travel of the tool changer gripper 2 in any radial direction perpendicular to the second direction D2 will not be interfered by the spring 7.

Figure 7:
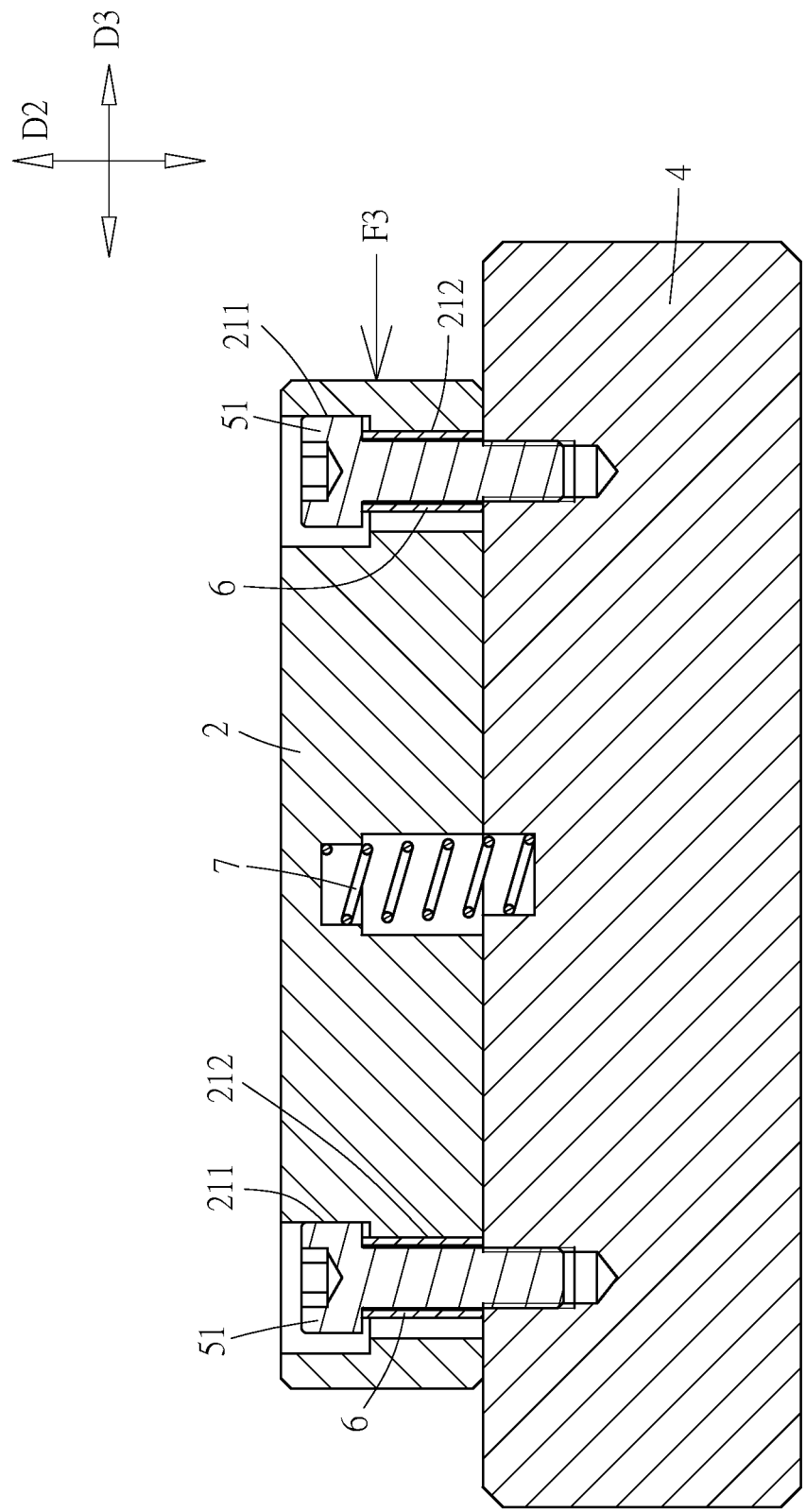
FIG. 7 is a fourth cross-sectional view showing the assembly of the tool changer gripper and the base of the present invention, wherein the third external operating force F3 acts on the tool changer gripper.

Please refer to FIG. 3 and FIG. 7. When the first coupling unit 1 and the second coupling unit 3 are in the process of performing the coupling operation or the decoupling operation, a position error will be generated on the first coupling unit 1 because of the path error of the robot arm end shaft A. The position error causes an external operating force to act on the second coupling unit 3 and the tool changer gripper 2. For the convenience of description, in this embodiment, the component force of the external operating force in the first direction D1 is denoted as a first external operating force F1, the component force of the external operating force in the second direction D2 is denoted as a second external operating force F2, and the component force of the external operating force in the third direction D3 is denoted as a third external operating force F3. When the third external operating force F3 acts on the tool changer gripper 2, the tool changer gripper 2 will move relative to the base 4 along the third direction D3 for a third travel. The third travel is a limited travel. When the first hole section 211 touches the screw head 51 or the second hole section 212 touches the sleeve 6, it is the destination of the limited travel. The maximum distance of the third travel is equal to the third upper clearance G31 or the third lower clearance G32 shown in FIG. 4. When the tool changer gripper 2 is moved for the third travel relative to the base 4 in the third direction D3, the spring 7 in the closed space is bent along the third direction D3. When the third external operating force F3 disappears, the spring 7 exerts a return force on the tool changer gripper 2, so that the tool changer gripper 2 returns to the position shown in FIG. 4.

Figure 8:
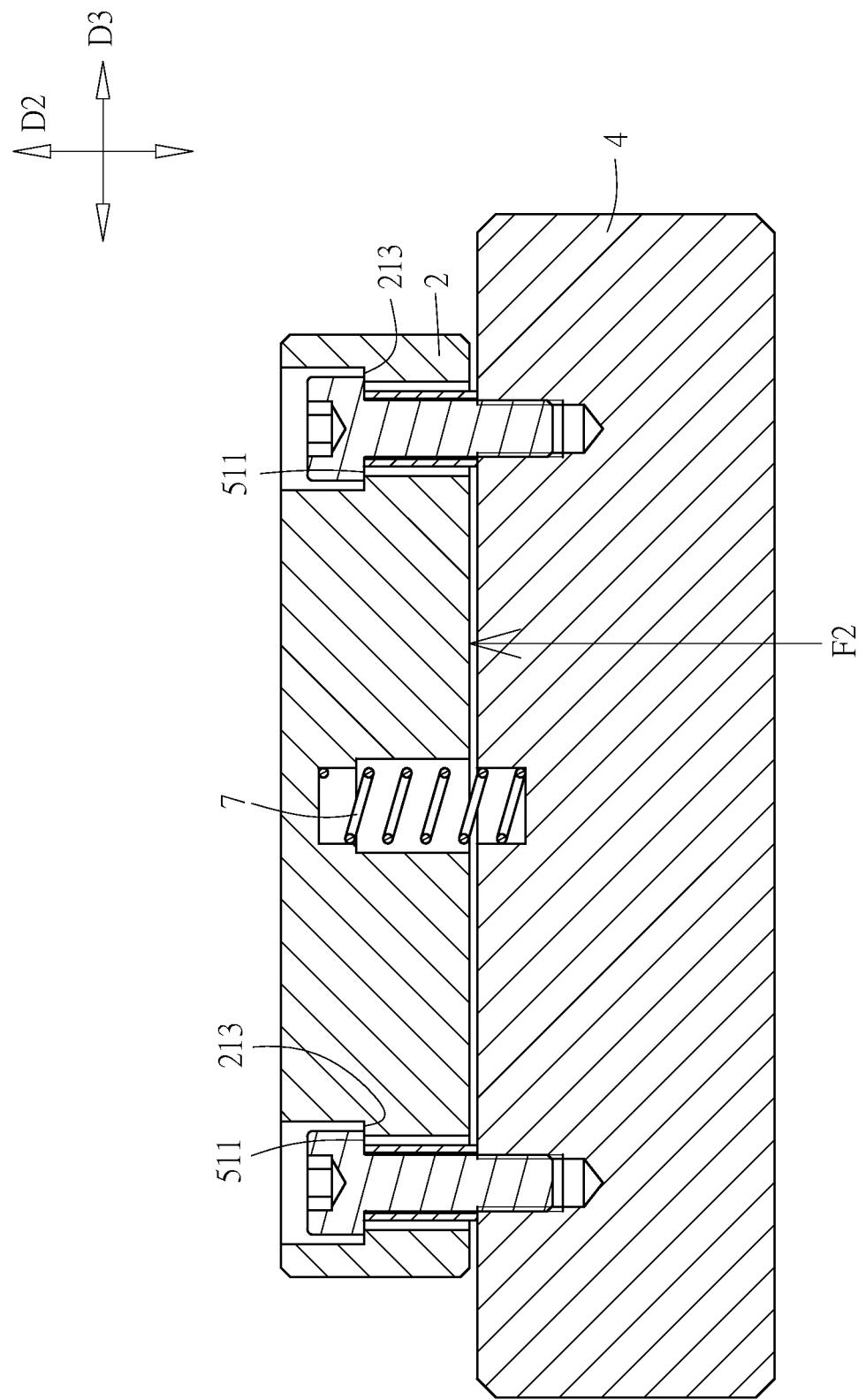
FIG. 8 is a fifth cross-sectional view showing the assembly of the tool changer gripper and the base of the present invention, wherein the second external operating force F2 acts on the tool changer gripper.

Please refer to FIG. 3 and FIG. 8. When the second external operating force F2 acts on the tool changer gripper 2, the tool changer gripper 2 will move relative to the base 4 along the second direction D2 for a second travel. The second travel is a limited travel. When the first hole section 211 touches the screw head 51 or the second hole section 212 touches the sleeve 6, it is the destination of the limited travel. The maximum distance of the second travel is equal to the second clearance G2 shown in FIG. 4. When the tool changer gripper 2 is moved for the second travel relative to the base 4 in the second direction D2, the spring 7 in the closed space is elongated along the second direction D2. When the second external operating force F2 disappears, the spring 7 exerts a return force on the tool changer gripper 2, so that the tool changer gripper 2 returns to the position shown in FIG. 4.

Figure 9:
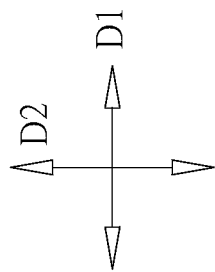
FIG. 9 is a sixth cross-sectional view showing the assembly of the tool changer gripper and the base of the present invention, wherein the first external operating force F1 acts on the tool changer gripper.
Figure 9:
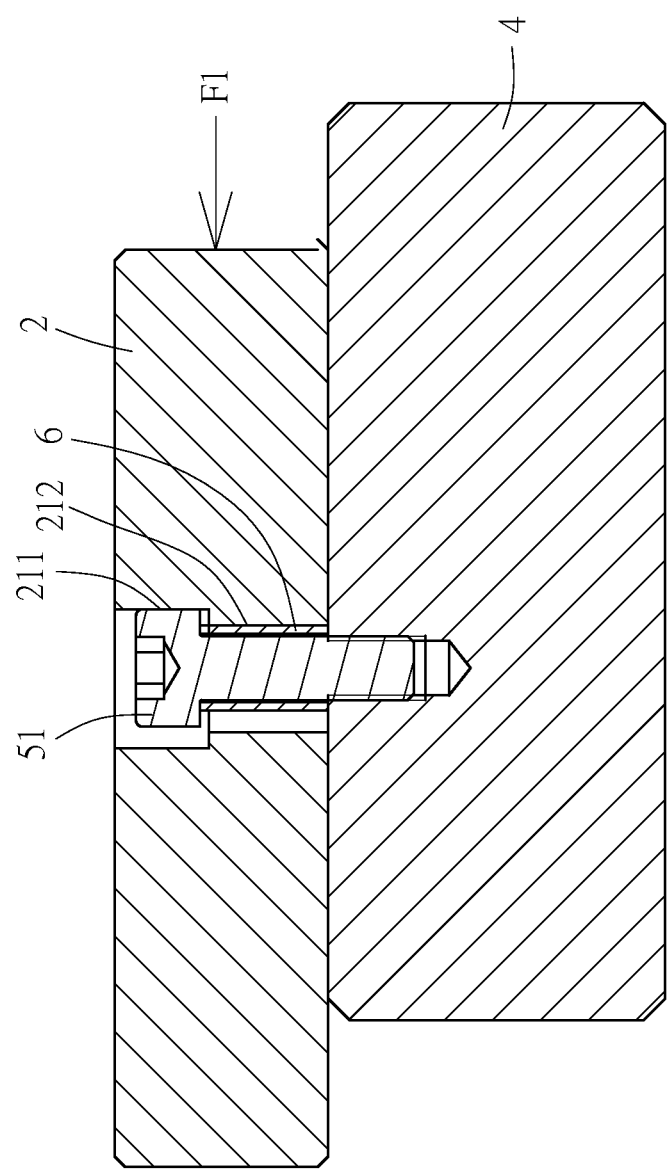
Figure 10:
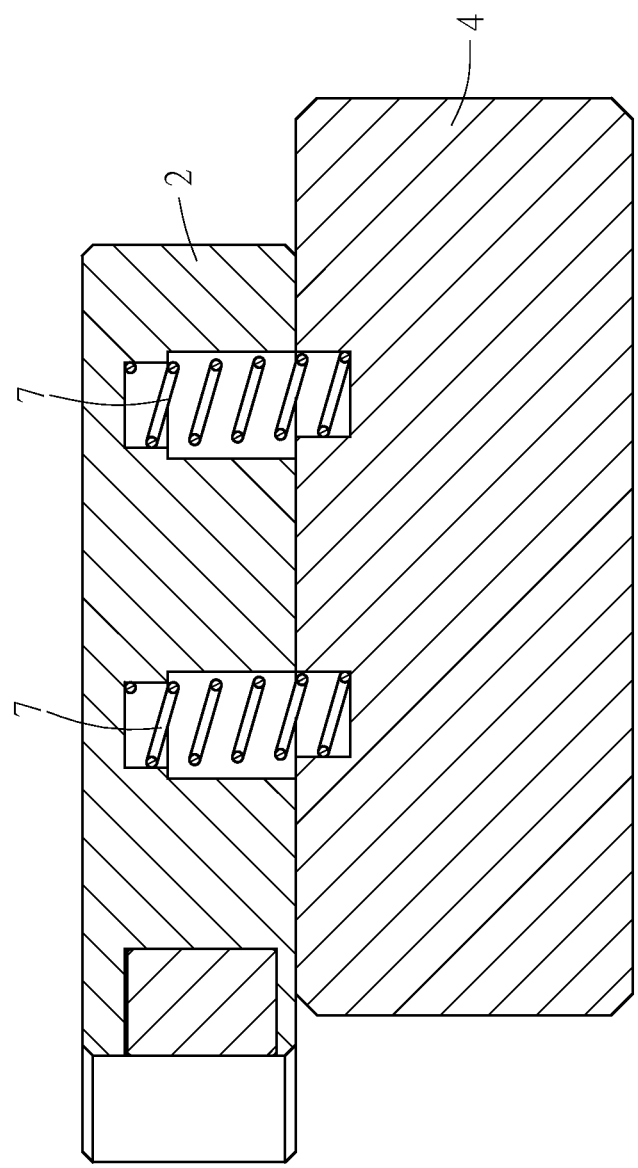
FIG. 10 is a seventh cross-sectional view showing the assembly of the tool changer gripper and the base of the present invention, wherein when the first external operating force F1 acts on the tool changer gripper; the spring in the closed space is elongated along the second direction.

Please refer to FIG. 3, FIG. 9 and FIG. 10. When the first external operating force F1 acts on the tool changer gripper 2, the tool changer gripper 2 will move relative to the base 4 along the first direction D1 for a first travel. The first travel is a limited travel. When the stepped surface 213 touches the screw head underside 511, it is the destination of the limited travel. The maximum distance of the first travel is equal to the first upper clearance G11 or the first lower clearance G12 shown in FIG. 5. When the tool changer gripper 2 is moved for the first travel relative to the base 4 in the first direction D1, the spring 7 in the closed space is bent along the first direction D1. When the first external operating force F1 disappears, the spring 7 exerts a return force on the tool changer gripper 2, so that the tool changer gripper 2 returns to the position shown in FIG. 5.

Figure 11:
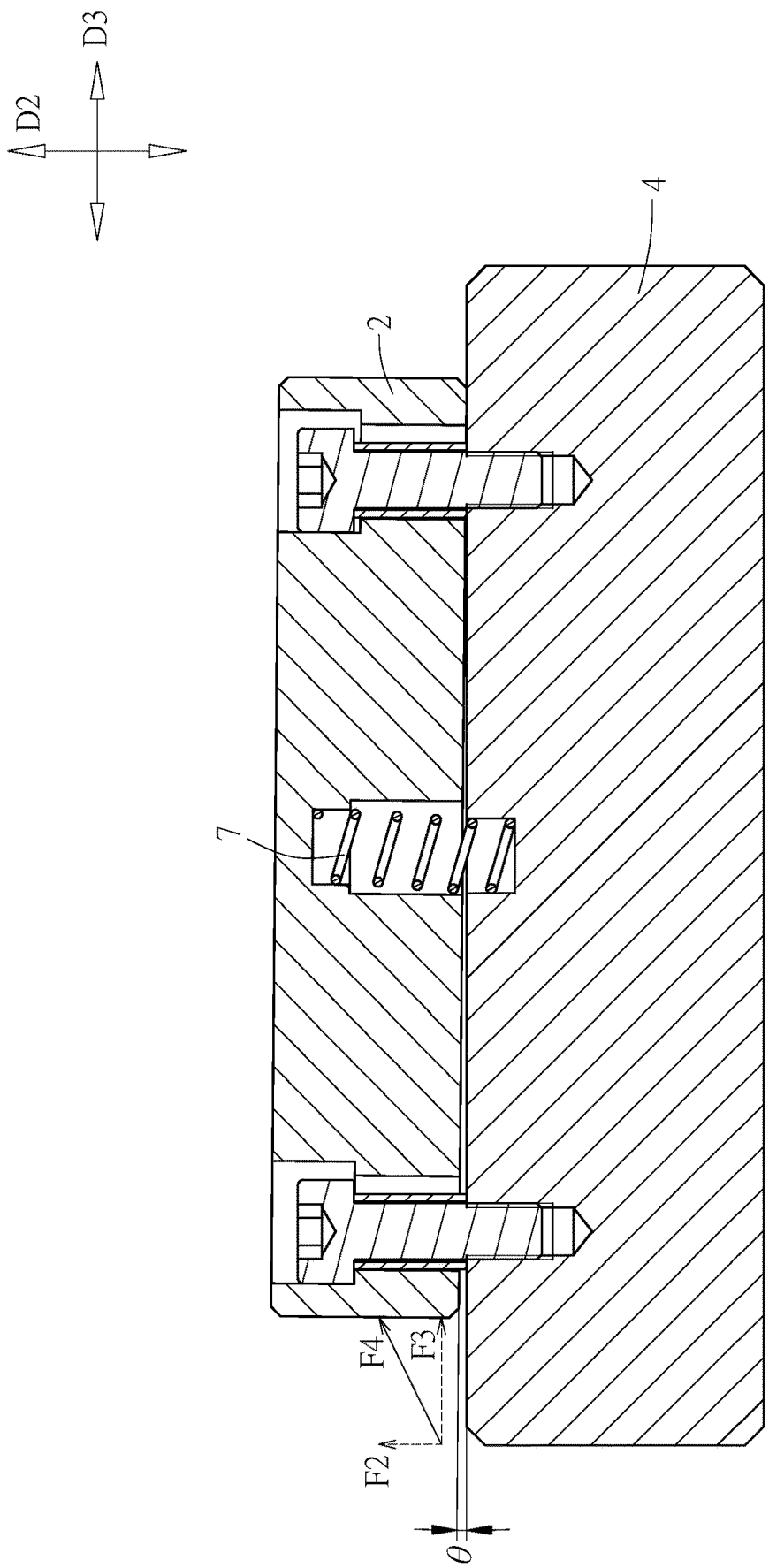
FIG. 11 is an eighth cross-sectional view showing the assembly of the tool changer gripper and the base of the present invention, wherein the diagonal external operating force F4 acts on the tool changer gripper.

Please refer to FIG. 3 and FIG. 11. If the external operating force is a combination of multi-directional component forces, for example, the second external operating force F2 and the third external operating force F3 act on the tool changer gripper 2 at the same time, the tool changer gripper 2 will move obliquely. As shown in FIG. 11, a diagonal external operation force F4 is the resultant force of the second external operation force F2 and the external operation force F3. The diagonal external operation force F4 acts on the tool changer gripper 2, which changes the third upper clearance G31 or the third lower clearance G32 shown in FIG. 4, and changes the second clearance G2. The tool changer gripper 2 is inclined relative to the base 4 by an angle θ, that is, the tool changer gripper 2 is rotated by an angle with the first direction D1 as the axis. At this time, the spring 7 in the closed space is deformed according to the inclination of the tool changer gripper 2. When the diagonal external operation force F4 disappears, the spring 7 exerts a return force on the tool changer gripper 2, so that the tool changer gripper 2 returns to the position shown in FIG. 4.

Similarly, with any combination of the first external operating force F1, the second external operating force F2 and the third external operating force F3, the tool changer gripper 2 can be moved or inclined relative to the base 4 in all dimensions. These movements or inclinations are the degrees of freedom of movement and rotation of the tool changer gripper 2. When the tool changer gripper 2 is moved or inclined relative to the base 4, the spring 7 is properly deformed in all dimensions according to the movement or inclination of the tool changer gripper 2. The deformation of the spring 7 exerts a return force to the tool changer gripper 2, so that when the first external operating force F1, the second external operating force F2, the third external operating force F3 or the diagonal external operating force F4 disappears, the tool changer gripper 2 returns to the position shown in FIG. 4 and FIG. 5.

Please refer to FIG. 4 and FIG. 5. The first upper clearance G11, the first lower clearance G12, the second clearance G2, the third upper clearance G31 and the third lower clearance G32 of the present invention are all adjustable. By replacing the sleeve 6 having a different wall thickness, the sizes of the third lower clearance G32 and the first lower clearance G12 can be changed. By replacing the sleeve 6 having a different height, the size of the second clearance G2 can be changed. By replacing the screw 5 of a different size to change the diameter of the screw head 51, the sizes of the third upper clearance G31 and the first upper clearance G11 can be changed. Through the adjustment of the first upper clearance G11, the first lower clearance G12, the second clearance G2, the third upper clearance G31 and the third lower clearance G32, the first travel, the second travel and the third travel are also adjusted, that is, the degree of freedom of the tool changer gripper 2 can be changed. In the state shown in FIG. 4 and FIG. 5, the replacement of the sleeve 6 having a different wall thickness means that the sleeve 6 having a smaller wall thickness is replaced with a sleeve 6 having a larger wall thickness, or, the sleeve 6 having a larger wall thickness is replaced with a sleeve 6 having a smaller wall thickness. Regardless of replacement, the wall thickness of the sleeve 6 is symmetrical. In this way, the degrees of freedom of the tool changer gripper 2 can be adjusted symmetrically. Taking FIG. 4 as an example, the tool changer gripper 2 is located at a preset position. By replacing the sleeve 6 having a different wall thickness, the degree of freedom change obtained by the tool changer gripper 2 will be symmetrical in the third direction D3.

Figure 12:
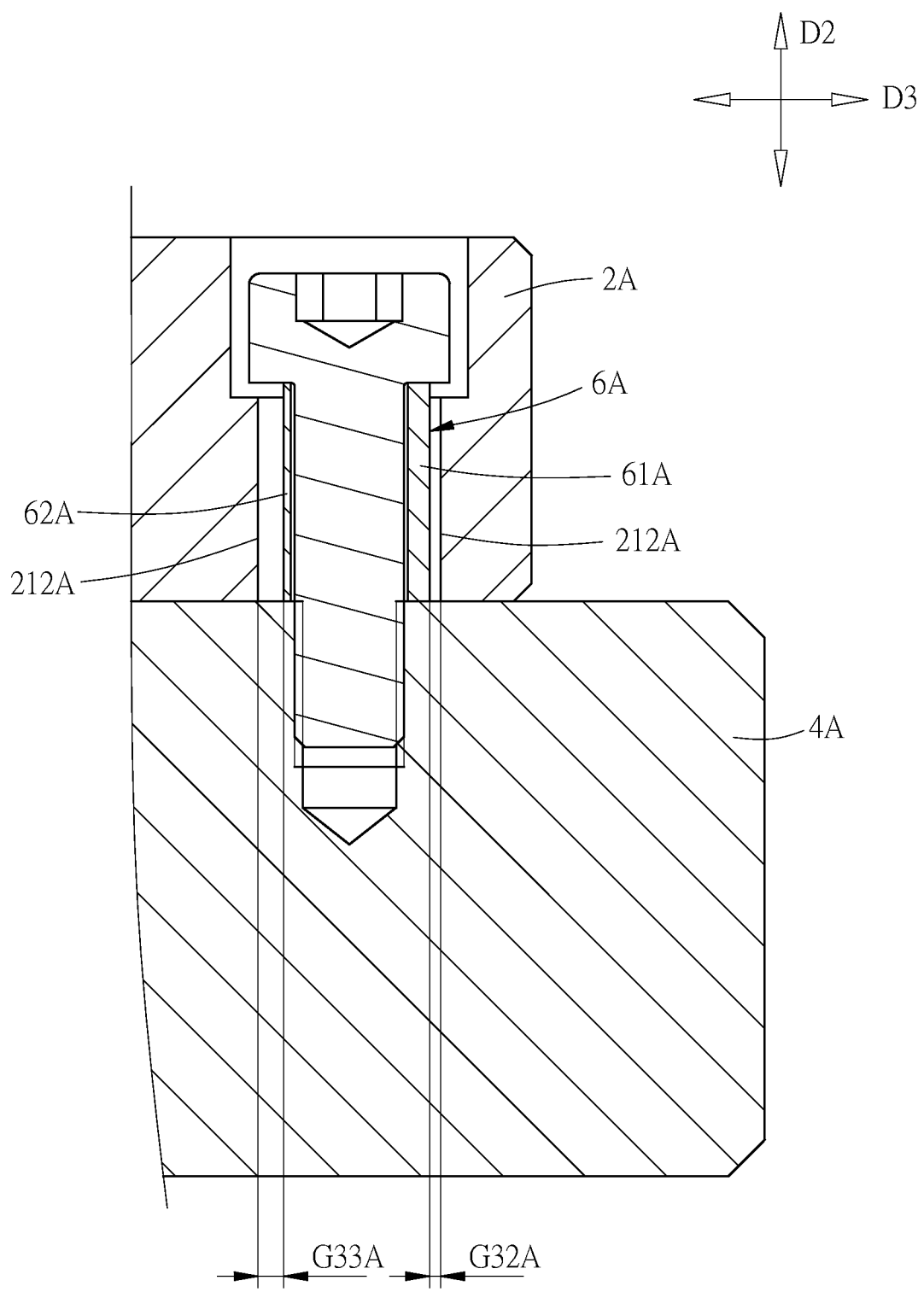
FIG. 12 is a ninth cross-sectional view showing the assembly of the tool changer gripper and the base of the present invention, wherein the sleeve has asymmetric wall thicknesses.

Please refer to FIG. 12. The sleeve 6 shown in the above embodiment may be an eccentric sleeve 6A. That is, the inner diameter axis and the outer diameter axis of the eccentric sleeve 6A are parallel to each other but not on the same axis. The eccentric sleeve 6A has a first wall 61A and a second wall 62A that have unequal thicknesses. The outer edge of the first wall 61A and the wall of the second hole section 212A form a third lower clearance G32A. The outer edge of the second wall 62A and the wall of the second hole section 212A form another third lower clearance G33A. The two third lower clearances G32A, G32A are not equal to each other. When the tool changer gripper 2A is moved relative to the base 4A along the third direction D3, the degree of freedom change obtained by the tool changer gripper 2A will be asymmetric in the third direction D3. As a result, the degree of freedom of the tool changer gripper 2A can be adjusted asymmetrically.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method for performing a tool change with a robot arm, comprising:
   providing a first coupling unit connected to a robot arm end shaft;
   providing a plurality of tool changer grippers and second coupling units, each of the second coupling units being detachably connected to a corresponding one of the tool changer grippers, and each of the tool changer grippers being connected to a respective one of a plurality of corresponding stationary bases, each of the tool changer grippers including a respective recess formed therein, and each of the stationary bases including a respective recess formed therein;
   establishing, for each of the tool changer grippers and each of the stationary bases, a respective first spring member insertable within: (i) the recess formed within the corresponding tool changer gripper, and (ii) the recess formed within the corresponding stationary base;
   driving the first coupling unit by the robot arm end shaft for coupling the first coupling unit with a selected one of the second coupling units in a coupling operation, and subsequently taking the selected second coupling unit away from the respective tool changer gripper;
   driving, by the robot arm end shaft, the first coupling unit coupled with the selected second coupling unit back to the respective tool changer gripper, and subsequently decoupling the first coupling unit from the selected second coupling unit in a decoupling operation;
   displacing one of said tool changer grippers with respect to the corresponding one of said stationary bases by actuation of the corresponding first spring member in one or more of three orthogonal directions to selectively align said one of said tool changer grippers with respect to the corresponding one of said stationary bases to accommodate misalignment of said one of said tool changer grippers with respect to the corresponding one of said stationary bases;

wherein each of the tool changer grippers is linearly displaceable relative to the corresponding stationary base and in each of at least two mutually-orthogonal horizontal directions of the three orthogonal directions; and when the first coupling unit of the robot arm end shaft is incorrectly positioned during the coupling or decoupling operations, a corresponding one of said tool changer grippers is displaced in at least one of the horizontal directions, the corresponding one of said tool changer grippers being elastically restored in the at least one of the horizontal directions via the corresponding first spring member to overcome displacement of the corresponding tool changer gripper in the at least one of the horizontal directions due to the incorrect positioning of the first coupling unit.

2. The method as claimed in claim 1, further comprising: assembling each tool changer gripper to be inclinable relative to the respective stationary base.

3. The method as claimed in claim 1, wherein each of the tool changer grippers is displaceable in a corresponding vertical direction.

4. The method as claimed in claim 1, wherein a return force via the corresponding first spring member elastically drives back the one of said tool changer grippers to overcome the displacement due to the incorrect positioning of the first coupling unit during the coupling operation or the decoupling operation, wherein an external operating force is generated by the incorrect positioning of the first coupling unit, and the external operating force being greater than the return force via said corresponding first spring member, thereby the one of said tool changer grippers deviating from a preset position, and subsequent to dissipation of the external operating force, the one of said tool changer grippers being elastically driven back to the preset position by the return force.

5. The method as claimed in claim 1, wherein the one of said tool changer grippers corresponding to the selected second coupling unit is displaceable in any one or more of the three orthogonal directions.

6. The method as claimed in claim 1, wherein the one of said tool changer grippers corresponding to the selected second coupling unit is displaceable in each of the three orthogonal directions.

7. A method for performing a tool change with a robot arm, comprising:
providing a first coupling unit connected to a robot arm end shaft;
providing a tool changer gripper and a second coupling unit, the second coupling unit being detachably connected to said tool changer gripper, and the tool changer gripper being connected to a stationary base by a first screw, said first screw having a first screw head, wherein a tool changer gripper through opening includes a first section having a first diameter greater than a diameter of said first screw head thereby providing a first clearance dimension between the first screw head and the first section, the tool changer gripper through opening also having a second section having a second diameter greater than a diameter of a first shank of the first screw thereby providing a second clearance dimension between said first shank and said second section of the tool changer gripper through opening, wherein the first clearance dimension and the second clearance dimension are configured so as to permit displacement of said tool changer gripper with respect to said stationary base;

driving the first coupling unit by the robot arm end shaft for coupling the first coupling unit with said second coupling unit in a coupling operation, and subsequently taking the second coupling unit away from the tool changer gripper;

driving, by the robot arm end shaft, the first coupling unit coupled with the second coupling unit back to the tool changer gripper, and subsequently decoupling the first coupling unit from the second coupling unit in a decoupling operation;

wherein said tool changer gripper is linearly displaceable in each of at least two mutually-orthogonal horizontal directions; and when the first coupling unit of the robot arm end shaft is incorrectly positioned during the coupling or decoupling operations, said tool changer gripper is displaced in at least one of the horizontal directions, the tool changer gripper being restorable in the at least one of the horizontal directions to overcome displacement thereof in the at least one of the horizontal directions due to the incorrect positioning of the first coupling unit.

8. The method as claimed in claim 7, including the step of selecting a second screw to replace the first screw, the second screw having a second screw head with a diameter that is different than the diameter of the first screw head of the first screw.

9. The method as claimed in claim 7 including the step of defining a third clearance dimension between the first screw and the tool changer gripper opening by providing a first sleeve with a length extending in a vertical direction beyond the second section of the tool changer gripper through opening.

10. The method as claimed in claim 9 including the step of adjusting said third clearance dimension by selecting a second sleeve to replace the first sleeve, the second sleeve having a different length in the vertical direction than the length of the first sleeve.

11. The method as claimed in claim 9, including the step of selecting a second sleeve to replace the first sleeve, the second sleeve having a wall thickness that is different from a wall thickness of the first sleeve.

12. The method as claimed in claim 9, the first sleeve extending about said first shank of said first screw and having a first wall portion having a first wall thickness and a second wall portion having a second wall thickness, the first wall thickness being different than the second wall thickness.

13. The method as claimed in claim 7, the tool changer gripper including a recess formed therein, the stationary base including a recess formed therein, the method further including the step of establishing a first spring member insertable within:
(i) the recess formed within said tool changer gripper, and
(ii) the recess formed within said stationary base.

* * * * *